United States Patent
DeFrancesco

(10) Patent No.: US 9,650,967 B2
(45) Date of Patent: May 16, 2017

(54) METHOD OF LOW PRESSURE BLEED

(71) Applicant: Hamilton Sundstrand Corporation, Windosr Locks, CT (US)

(72) Inventor: Gregory L. DeFrancesco, Simsbury, CT (US)

(73) Assignee: Hamiilton Sundstrand Corporation, Windsor Locks, CT (US)

( * ) Notice: Subject to any disclaimer, the term of this patent is extended or adjusted under 35 U.S.C. 154(b) by 41 days.

(21) Appl. No.: 14/713,041

(22) Filed: May 15, 2015

(65) Prior Publication Data
US 2015/0247463 A1    Sep. 3, 2015

Related U.S. Application Data

(62) Division of application No. 13/006,829, filed on Jan. 14, 2011, now Pat. No. 9,062,604.

(51) Int. Cl.
| | |
|---|---|
| B64D 13/06 | (2006.01) |
| F02C 9/18 | (2006.01) |
| B64D 13/08 | (2006.01) |
| F02C 6/08 | (2006.01) |
| F02C 7/18 | (2006.01) |

(52) U.S. Cl.
CPC ............... *F02C 9/18* (2013.01); *B64D 13/06* (2013.01); *B64D 13/08* (2013.01); *F02C 6/08* (2013.01); *F02C 7/185* (2013.01); *B64D 2013/0618* (2013.01); *Y02T 50/56* (2013.01)

(58) Field of Classification Search
CPC .............................................. B64D 2013/0618
USPC ................ 62/172, 401, DIG. 5; 60/782, 785
See application file for complete search history.

(56) References Cited

U.S. PATENT DOCUMENTS

| | | |
|---|---|---|
| 3,511,161 A | 5/1970 | Schindelman |
| 4,091,613 A | 5/1978 | Young |
| 4,257,552 A | 3/1981 | Farkas et al. |
| 4,263,786 A | 4/1981 | Eng |
| 4,430,867 A | 2/1984 | Warner |
| 4,445,342 A | 5/1984 | Warner |
| 5,114,100 A | 5/1992 | Rudolph et al. |
| 5,137,230 A | 8/1992 | Coffinberry |
| 5,704,218 A | 1/1998 | Christians et al. |
| 6,189,324 B1 | 2/2001 | Williams et al. |
| 7,607,308 B2 | 10/2009 | Kraft et al. |
| 2009/0000305 A1 | 1/2009 | Porte et al. |

FOREIGN PATENT DOCUMENTS

WO    2005063576 A1    7/2005

OTHER PUBLICATIONS

Extended European Search Report, dated Mar. 12, 2014, for European Application No. 11195845.0.

*Primary Examiner* — Jonathan Bradford
(74) *Attorney, Agent, or Firm* — Kinney & Lange, P.A.

(57) ABSTRACT

A method for decreasing a throttle setting at which a gas turbine-powered aircraft must switch from low-pressure bleed air to a high-pressure bleed air. The method includes flowing low-pressure bleed air from a compressor at a first pressure. A first portion of the low-pressure bleed air is directed to an air-to-air heat exchanger and cooled in the air-to-air heat exchanger. The first portion of the low-pressure bleed air is flowed from the air-to air heat exchanger into a cooled bleed air line. A second portion of the low-pressure bleed air is directed to a low-pressure bypass line. The second portion of the low-pressure bleed air is flowed from the low-pressure bypass line into the cooled bleed air line upstream of an environmental control system.

20 Claims, 3 Drawing Sheets

METHOD OF LOW PRESSURE BLEED

CROSS-REFERENCE TO RELATED APPLICATION(S)

This application claims priority as a divisional application under 35 U.S.C. §121 of earlier filed application Ser. No. 13/006,829 entitled "LOW PRESSURE BLEED ARCHITECTURE" by Gregory L. DeFrancesco and filed Jan. 14, 2011, which is hereby incorporated by reference.

BACKGROUND

The present invention relates to aircraft environmental control systems. In particular, the invention relates to bleed air systems for supplying compressed air to an aircraft environmental control system.

Aircraft environmental control systems maintain aircraft cabin air pressures and temperatures within a target range for the safety and comfort of aircraft passengers. This is done through the use of compressed air taken from two compressor stages (bleed air) of the turbine engines propelling the aircraft. Each of the two air pressures available from the compressor, low pressure (LP) and high pressure (HP), are directed to the environmental control system (ECS) through pressure lines or plenums. A pneumatic valve controller operates a series of pneumatically operated bleed valves in response to electronic control signals from the ECS (or from a dedicated ECS bleed valve controller) to control the relative flows of LP and HP compressed air flowing to the ECS. The LP and HP bleed air as taken from the compressor is at a very elevated temperature due to the natural increase in the temperature of a gas as it is compressed. Thus, before the bleed air flows to the ECS, where it is cooled to a desired cabin temperature, it is "pre-cooled" by flowing through an air-to-air heat exchanger known as a "pre-cooler." Cool fan air from the bypass region of the engine also flows through the pre-cooler to cool the bleed air. Air pressure in the bleed air lines is measured by at least one pressure sensor which provides this information to the ECS. Similarly, air temperature in the bleed air lines is measured by at least one temperature sensor which provides this information to ECS. The ECS uses the air pressure and temperature information along with other information from around the aircraft to direct the pneumatic valve controller to provide bleed air at a desired pressure to the environmental control system. The ECS also directs a fan air valve to adjust the flow of fan air to the pre-cooler to provide bleed air to the ECS at a desired temperature.

SUMMARY

The present invention concerns a bleed air conditioning system within an aircraft including a low-pressure bleed air line carrying bleed air at a first pressure from a compressor and a high-pressure bleed air line carrying bleed air at a second pressure from the compressor, in which the second pressure is higher than the first pressure. The system also includes an air-to-air heat exchanger cooled by a cooling air flow and an un-cooled bleed air line to connect the air-to-air heat exchanger to the low-pressure bleed air line and the high-pressure bleed air line. The un-cooled bleed air line carries a flow of un-cooled bleed air from at least one of the low-pressure bleed air line and the high-pressure bleed air line to the air-to-air heat exchanger. The system also includes a cooled bleed air line connected to the air-to-air heat exchanger for carrying cooled bleed air from the air-to-air heat exchanger and a low-pressure bypass line connecting the low-pressure bleed air line to the cooled bleed air line, bypassing un-cooled bleed air from the low-pressure line around the air-to-air heat exchanger to the cooled bleed air line.

DETAILED DESCRIPTION

Conventional bleed systems direct LP bleed air through a pre-cooler to the ECS, until a higher pressure is required by the ECS. Then HP bleed air is directed through the pre-cooler to the ECS. Although HP bleed air is much hotter than LP bleed air, both LP and HP bleed air are too hot for use by the ECS and must be pre-cooled. Pre-cooling decreases the pressure of the bleed air flowing to the ECS. Under normal flight conditions, the LP air is generally sufficient for all ECS requirements. However, under low throttle settings, for example, aircraft descent, when the engines are idling, the LP bleed air pressure is not sufficient, once pre-cooled, to meet the demands of the ECS. Under these conditions, much hotter HP bleed air is used. The flow of HP bleed air under low throttle settings represents the greatest cooling load requirement for the pre-cooler and determines the size of the pre-cooler.

In the present invention the LP bleed air line splits into two parallel LP bleed air lines, one joining the HP bleed air line and directed to the pre-cooler and another that bypasses the pre-cooler, joining the bleed air line beyond the pre-cooler. By splitting the flow such that a portion bypasses the pre-cooler, the pressure drop in the LP bleed air associated with the pre-cooler is reduced. Thus, the bleed air pressure available to the ECS on LP bleed air is higher for a given throttle setting than it would be without the LP bypass. As a result, HP bleed air is not required until a comparatively lower throttle setting than without the LP bypass. At the comparatively lower throttle setting, the temperature of the HP bleed air is also comparatively lower such that the pre-cooler size can be smaller and the pre-cooler lighter. A smaller pre-cooler saves space within the aircraft and a lighter pre-cooler reduces fuel consumption. In addition, drawing high temperature HP bleed air from the engine results in a large energy penalty. By delaying the shift to HP bleed air until the engine is at a lower throttle setting, the HP bleed air is withdrawn at a lower temperature and for a shorter period of time, reducing the energy penalty.

Figure 1:
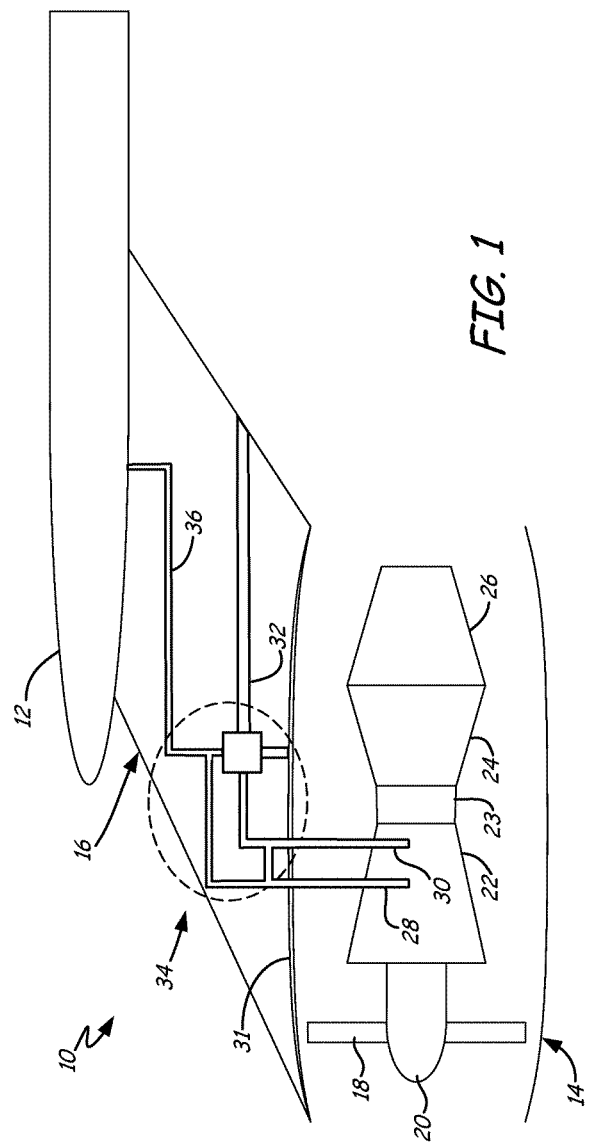
FIG. 1 is a side schematic view of a bypass turbine engine and pylon incorporating a low pressure bleed system of the present invention.

FIG. 1 is a side schematic view of a bypass turbine engine and pylon incorporating a low pressure bleed system of the present invention. FIG. 1 shows aircraft propulsion system 10 attached to aircraft wing 12 and includes bypass turbine engine 14 and pylon 16. Bypass turbine engine 14 includes fan 18, turbine engine shaft 20, compressor 22, combustor 23, turbine 24, exhaust nozzle 26, LP bleed air line 28, HP bleed air line 30, and engine mount beam 31. Pylon 16 includes fan air plenum 32, bleed air conditioning system 34, and cooled bleed air line 36.

Pylon 16 connects bypass turbine engine 14 at engine mount beam 31 to wing 12. Compressor 22 connects fan 18 and combustor 23. Combustor 23 connects compressor 22 and turbine 24. Exhaust nozzle 26 is attached to turbine 24. Turbine engine shaft 20 is connected to fan 18, compressor 22, and turbine 24. LP bleed air line 28 and HP bleed air line 30 are attached to stages of compressor 22 providing air of low pressure and high pressure, respectively. LP bleed air line 28 and HP bleed air line 30 are also attached to bleed air conditioning system 34 in pylon 16. Fan air plenum 32 extends from bypass turbine engine 14, through engine mount beam 31, bleed air conditioning system 34, and out pylon 16. Cooled bleed air line 36 extends from bleed air conditioning system 34 through pylon 16 to wing 12 and on to the environmental control system (not shown).

In operation, air is compressed in stages by compressor 22 and ignited with fuel in combustor 23 to produce rapidly expanding gasses that drive rotation in turbine 24. The expanding gasses exit exhaust nozzle 26 providing a portion of the engine thrust. Turbine 24 rotates attached turbine engine shaft, providing power for the compression of air in compressor 22 and for the rotation of fan 18. Fan 18 rotates to provide a flow of fan air (F) through bypass turbine engine 14. The flow of fan air exiting bypass turbine engine 14 near nozzle 26 provides the balance of the engine thrust. A portion of the fan air (fan bleed air) flows into fan air plenum 32 for use by bleed air conditioning system 34. LP bleed air line 28 and HP bleed air line 30 direct air from the low pressure and high pressure stages, respectively, of compressor 22 to bleed air conditioning system 34. Bleed air conditioning system 34 uses low pressure bleed air provided by LP bleed air line 28, high pressure bleed air provided by HP bleed air line 30, and fan bleed air provided by fan air plenum 32 to deliver cooled bleed air to the ECS through cooled bleed air line 36 at a temperature and pressure required by the ECS.

Figure 2:
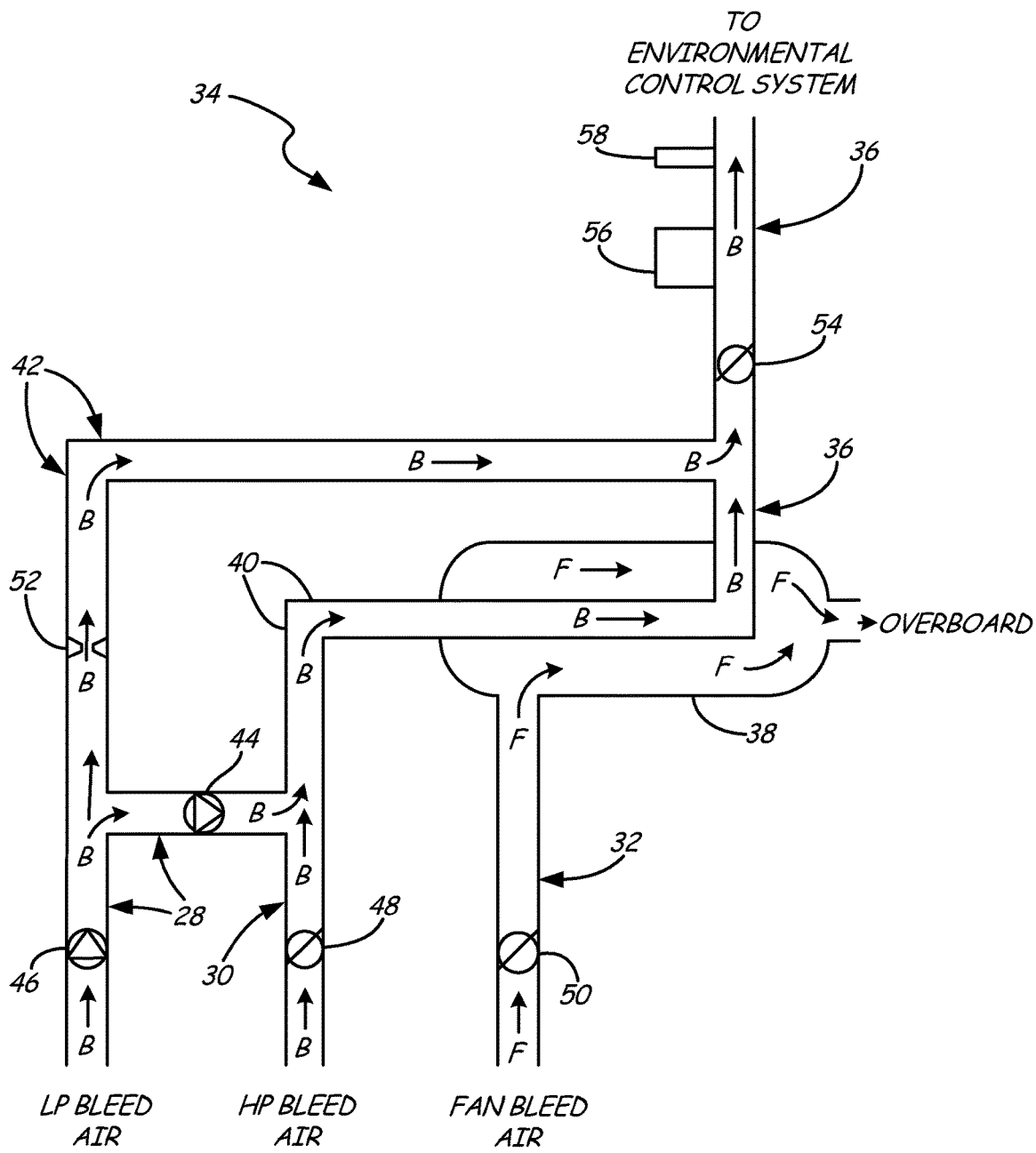
FIG. 2 is a more detailed side schematic view of a portion of FIG. 1 illustrating an embodiment of a low pressure bleed system of the present invention.

FIG. 2 is a more detailed side schematic view of a portion of FIG. 1 illustrating an embodiment of a low pressure bleed system of the present invention. FIG. 2 shows bleed air conditioning system 34 including LP bleed air line 28, HP bleed air line 30, fan air plenum 32, cooled bleed air line 36, pre-cooler 38, un-cooled bleed air line 40, and LP bypass line 42. LP bleed air line 28 comprises first LP check valve 44 and second LP check valve 46. HP bleed air line 30 comprises HP bleed valve 48. Fan air plenum 32 comprises fan bleed valve 50. LP bypass line 42 comprises LP bypass orifice 52. Cooled bleed air line 36 comprises bleed air pressure regulator and shut-off valve 54, pressure sensor 56, and temperature sensor 58.

LP bleed air line 28 and HP bleed air line 30 connect to un-cooled bleed air line 40. First check valve 44 and second check valve 46 are oriented in LP bleed air line 28 to prevent bleed air from flowing toward compressor 22 of FIG. 1. HP bleed valve 48 controls the flow of high-pressure bleed air from compressor 22 of FIG. 1. Pre-cooler 38 connects un-cooled bleed air line 40 to cooled bleed air line 36. Pre-cooler 38 is an air-to-air heat exchanger connected to fan air plenum 32 such that there is efficient heat transfer between the bleed air flow through pre-cooler 38 and the fan bleed air flow (F) through pre-cooler 38, without mixing of the bleed air flow and the fan bleed air flow. Fan bleed valve 50 controls the flow of fan bleed air into pre-cooler 38. LP bypass line 42 connects LP bleed air line 28 to cooled bleed air line 36, bypassing LP bleed air from LP bleed air line 28 around pre-cooler 38. LP bypass line 42 connects to LP bleed air line 28 at a point between first check valve 44 and second check valve 46. LP bypass orifice 52 produces a pressure drop in the flow through LP bypass line 42. Pressure regulator and shut-off valve 54 is downstream of the point at which LP bypass line 42 connects to cooled bleed air line 36. Pressure sensor 56 and temperature sensor 58 are downstream from pressure regulator and shut-off valve 54.

In operation, bleed air conditioning system 34 supplies cooled bleed air at a desired pressure and temperature in response to electronic control signals from the ECS (not shown) directed to HP bleed valve 48, fan bleed valve 50, and pressure regulator and shut-off valve 54. Pressure sensor 56 and temperature sensor 58 provide measurements to the ECS. Under nominal throttle settings, for example, during sustained flight or takeoff, LP bleed air pressure is sufficient for ECS requirements. LP bleed air flows from LP bleed air line 28 through second check valve 46. Beyond second check valve 46, the LP bleed air flow splits into a first portion of LP bleed air and a second portion of LP bleed air where LP bypass line 42 connects to LP bleed air line 28.

The first portion of LP bleed air continues in LP bleed air line 28, through first check valve 44, into un-cooled bleed air line 40, and into pre-cooler 38. The first portion of LP bleed air is cooled as it flows through pre-cooler 38 by heat transfer to fan bleed air also flowing through pre-cooler 38. Fan bleed valve 50 is adjusted by the ECS to provide the fan bleed air flow necessary to achieve cooling required by the ECS. The heat transfer is by conduction through a heat exchange surface of relatively large area, and by convection to and from the heat exchange surface by the first portion of LP bleed air flow and the fan bleed air flow, respectively. At no point in pre-cooler 38 does flow of the first portion of LP bleed air and the flow of fan bleed air intermix. The cooled first portion of LP bleed air flows from pre-cooler 38 into cooled bleed air line 36. Simultaneously, the second portion flows through LP bypass line 42, through LP bypass orifice 52, to cooled bleed air line 36. At cooled bleed air line 36, the cooled first portion of LP bleed air and the un-cooled second portion of LP bleed air recombine. To achieve the desired temperature in cooled bleed air line 36, the first portion of LP bleed air must be overcooled in pre-cooler 38 so that when combined with the un-cooled second portion of LP bleed air, the bleed air temperature in cooled bleed air line 36 is the temperature required by the ECS. Because pre-cooler 38 is sized, as noted above, to cool HP bleed air under low throttle settings, overcooling the first portion of LP bleed air is well within the capability of pre-cooler 38. Finally, pressure regulator and shut-off valve 54 adjusts the cooled bleed air flow to achieve the pressure required by the ECS.

At sufficiently low throttle settings, LP bleed air pressure is not sufficient for ECS requirements. Under these conditions, HP bleed valve 48 opens and HP bleed air flows from HP bleed air line 30 in to un-cooled bleed air line 40. The HP bleed air causes first LP check valve 44 to close, preventing any flow between LP bleed air line 28 and pre-cooler 38 and preventing any flow of HP bleed air back into compressor 22 of FIG. 1. The HP bleed air flows into un-cooled bleed air line 40, and into pre-cooler 38. The HP bleed air is cooled as it flows through pre-cooler 38 as describe above for the first portion of LP bleed air. However, because the HP bleed air is much hotter than the LP bleed air, fan bleed valve 50 is directed open further to increase the flow of fan bleed air. This represents the largest cooling load for pre-cooler 38 and determines the capacity of pre-cooler 38. The cooled HP bleed air flows from pre-cooler 38 into cooled bleed air line 36. The cooled HP bleed air increases the pressure in LP bypass line 42, causing second LP check valve 46 to close, again preventing any flow of HP bleed air back into compressor 22. Pressure regulator and shut-off valve 54 adjusts the cooled bleed air flow to achieve the pressure required by the ECS.

Pre-cooling decreases the pressure of the cooled LP bleed air relative to the un-cooled LP bleed air due to the pressure restriction caused by the flow of bleed air through pre-cooler 38. LP bypass line 42 must be sized to create some pressure drop along its length to balance the flow of the first portion of LP bleed air through pre-cooler 38 and the flow of the second portion of LP bleed air through LP bypass line 42. If LP bypass line 42 presents too little restriction to flow, the cooled first portion of LP bleed air becomes too small, when combined with much larger un-cooled second portion of LP bleed air, to provide the required temperature in cooled bleed air line 36 under a condition of maximum LP bleed temperature. Alternatively, as shown in FIG. 2, LP bypass orifice 52 is sized to produce a pressure drop in the flow through LP bypass line 42 sufficient to provide a balanced (but not necessarily equal) flow between the first portion of LP bleed air and the second portion of LP bleed air. Although this places a flow restriction comparable to that of pre-cooler 38 in LP bypass line 42, the pressure drop from LP bleed air line 28 to cooled bleed air line 36 is reduced because the LP bleed air flows through two channels, each carrying a lower flow rate than would be required to go through pre-cooler 38 in the absence of LP bypass line 42.

Figure 3:
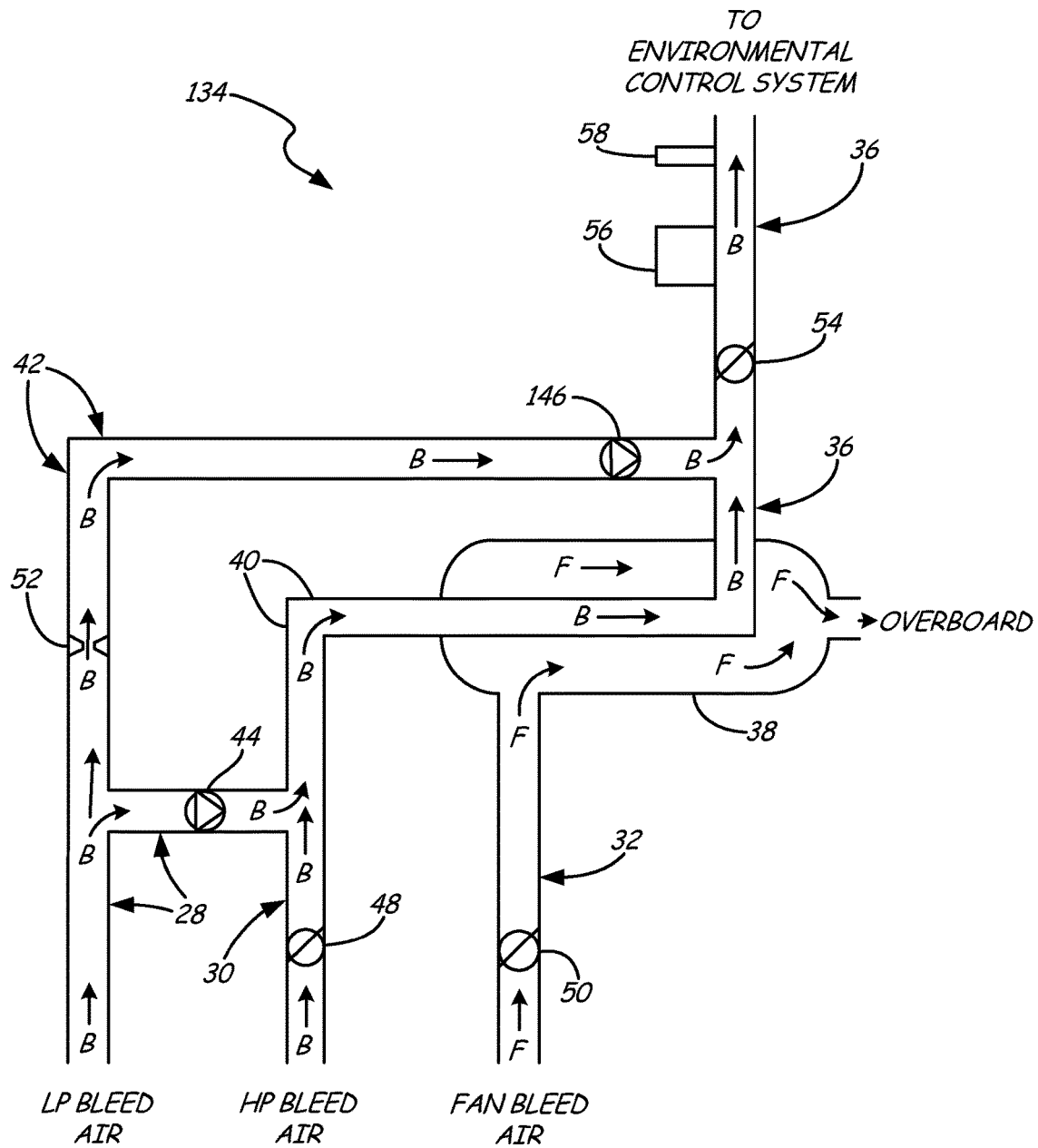
FIG. 3 is a more detailed side schematic view of a portion of FIG. 1 illustrating another embodiment of a low pressure bleed system of the present invention.

FIG. 3 is a more detailed side schematic view of a portion of FIG. 1 illustrating another embodiment of a low pressure bleed system of the present invention. Bleed air conditioning system 134 shown in FIG. 3 is identical to bleed air conditioning system 34 shown in FIG. 2, except that second LP check valve 46 is omitted from LP bleed air line 28 and an identical second LP check valve 146 is included in LP bypass line 42. Operation is also the same, except that the second portion of LP bleed air flows through LP bypass line 42, through LP bypass orifice 52, and through second LP check valve 146 before reaching cooled bleed air line 36. The biggest difference in operation between the embodiments of FIG. 3 and FIG. 2 is when HP bleed air flow is required. After the cooled HP bleed air flows from pre-cooler 38 into cooled bleed air line 36, instead of increasing the pressure in LP bypass line 42, second check valve 146 closes, preventing an increase of pressure in LP bypass line 42, as well as preventing any flow of HP bleed air back into compressor 22.

In all embodiments of the present invention, by splitting the LP bleed air line into two parallel LP bleed air lines, one joining the HP bleed air line and directed to the pre-cooler, and the other bypassing the pre-cooler and joining the bleed air line beyond the pre-cooler, the pressure drop in the LP bleed air associated with the pre-cooler is reduced. Thus, the bleed air pressure available to the ECS from LP bleed air is higher for a given throttle setting than it would be without the LP bypass. As a result, HP bleed air is not required until a comparatively lower throttle setting than without the LP bypass. At the comparatively lower throttle setting, the temperature of the HP bleed air is also comparatively lower such that the pre-cooler size can be smaller and the pre-cooler lighter. A smaller pre-cooler saves space at a critical location within the aircraft (e.g. pylon, nacelle, etc.) and a lighter pre-cooler reduces fuel consumption. In addition, drawing high temperature HP bleed air from the engine results in a large energy penalty. By delaying the shift to HP bleed air until the engine is at a lower throttle setting, the HP bleed air is withdrawn at a lower temperature and for a shorter period of time, reducing the energy penalty.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for decreasing a throttle setting at which a gas turbine-powered aircraft must switch from low-pressure bleed air to a high-pressure bleed air, the method comprising:

flowing low-pressure bleed air from a compressor at a first pressure;

directing a first portion of the low-pressure bleed air to an air-to-air heat exchanger;

cooling the first portion of the low-pressure bleed air in the air-to-air heat exchanger;

flowing the first portion of the low-pressure bleed air from the air-to air heat exchanger into a cooled bleed air line;

directing a second portion of the low-pressure bleed air to a low-pressure bypass line; and flowing the second portion of the low-pressure bleed air from the low-pressure bypass line into the cooled bleed air line upstream of all components of an environmental control system.

2. The method of claim 1, further comprising:

flowing high-pressure bleed air from a compressor at a second pressure, wherein the second pressure is greater than the first pressure;

preventing the flow of the first portion of low-pressure bleed air to the air-to-air heat exchanger by flowing the high-pressure bleed air;

preventing the flow of the second portion of low-pressure bleed air to the cooled bleed air line by flowing the high-pressure bleed air;

directing the high-pressure bleed air to the air-to-air heat exchanger;

cooling the high-pressure bleed air in the air-to-air heat exchanger; and flowing the high-pressure bleed air from the air-to air heat exchanger into the cooled bleed air line.

3. The method of claim 2, wherein preventing the flow of the first portion of low-pressure bleed air to the air-to-air heat exchanger by flowing the high-pressure bleed air and preventing the flow of the second portion of low-pressure bleed air to the cooled bleed air line by flowing the high-pressure bleed air further comprises:

flowing the first portion of the low-pressure bleed air to the air-to-air heat exchanger through a check valve; and flowing the second portion of the low-pressure bleed air through a check valve.

4. The method of claim 1, further comprising:

balancing the flow of the second portion of low-pressure bleed air through the low-pressure bypass line with the flow of the first portion of low-pressure bleed air through the air-to-air heat exchanger.

5. The method of claim 4, wherein balancing the second portion of low-pressure bleed air through the low-pressure bypass line with the flow of the first portion of low-pressure bleed air through the air-to-air heat exchanger further comprises:

flowing the second portion of low-pressure bleed air through an orifice disposed within the low-pressure bypass line.

6. The method of claim 1, further comprising:
providing fan bleed air to the air-to-air heat exchanger, the fan bleed air acting as cooling air.

7. The method of claim 6, further comprising:
controlling the flow of fan bleed air to the air-to-air heat exchanger with a fan bleed valve.

8. The method of claim 1, further comprising:
sensing a pressure of the bleed air in the cooled bleed air line downstream of the point of connection between the low-pressure bypass line and the cooled bleed air line with a pressure sensor.

9. The method of claim 1, further comprising:
sensing a temperature of the bleed air in the cooled bleed air line downstream of the point of connection between the low-pressure bypass line and the cooled bleed air line with a temperature sensor.

10. A method of flowing air to an environmental control system, the method comprising:
flowing a first fluid at a first pressure through a first line;
flowing a first portion of first fluid to a second line;
directing the first portion of first fluid to a heat exchanger;
cooling the first portion of first fluid in the heat exchanger;
flowing the first portion of first fluid from the heat exchanger into a third line;
flowing a second portion of first fluid around the heat exchanger through the first line; and
flowing the second portion of first fluid from the first line into the third line at a location upstream of all components of the environmental control system.

11. The method of claim 10, further comprising:
flowing a second fluid at a second pressure through the second line, wherein the second pressure is greater than the first pressure;
directing the second fluid to the heat exchanger;
cooling the second fluid in the heat exchanger; and
flowing the second fluid into the third line and to the environmental control system.

12. The method of claim 11, further comprising:
preventing the flow of the first portion of first fluid to the second line; and
preventing the flow of the second portion of first fluid to the third line.

13. The method of claim 12, wherein preventing the flow of the first portion of the first fluid to the second line and preventing the flow of the second portion of first fluid to the third line further comprises:
flowing the first portion of first fluid through a check valve disposed upstream of the second line; and
flowing the second portion of first fluid through a check valve disposed within the first line.

14. The method of claim 10, further comprising:
balancing the flow of the first portion of first fluid through the second line with the flow of the second portion of first fluid through the first line.

15. The method of claim 14, wherein balancing the flow of the first portion of first fluid through the second line with the flow of the second portion of first fluid through the first line further comprises:
flowing the second portion of first fluid through an orifice disposed within the first line.

16. The method of claim 10, further comprising:
providing air to the heat exchanger, the air acting as cooling air.

17. The method of claim 16, wherein providing air to the heat exchanger further comprises:
providing bleed air from a fan to the heat exchanger, the bleed air acting as cooling air.

18. The method of claim 17, further comprising:
controlling the flow of bleed air to the heat exchanger with a valve.

19. The method of claim 10, further comprising:
sensing a temperature of the fluid in the third line downstream of the point of connection between the first line and the third line with a temperature sensor.

20. The method of claim 10, further comprising:
sensing a pressure of the fluid in the third line downstream of the point of connection between the first line and the third line with a pressure sensor.

* * * * *